(12) United States Patent
Hayakawa et al.

(10) Patent No.: US 8,659,849 B2
(45) Date of Patent: Feb. 25, 2014

(54) HERMETICALLY RESEALABLE HARD-DISK DRIVE CONFIGURED FOR RECHARGING WITH A LOW-DENSITY GAS

(75) Inventors: Takako Hayakawa, Kanagawa (JP); Kouki Uefune, Kanagawa (JP); Kimihiko Sudo, Kanagawa (JP); Noritaka Otake, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/340,332

(22) Filed: Dec. 29, 2011

(65) Prior Publication Data

US 2013/0170074 A1 Jul. 4, 2013

(51) Int. Cl.
*G11B 33/08* (2006.01)
*G11B 33/14* (2006.01)

(52) U.S. Cl.
USPC ..................... 360/97.22; 360/99.19

(58) Field of Classification Search
USPC ..................... 360/97.12, 97.22, 97.16, 97.18, 360/99.15–99.22
See application file for complete search history.

(56) References Cited

U.S. PATENT DOCUMENTS

| | | | |
|---|---|---|---|
| 4,735,832 A * | 4/1988 | Ichikawa et al. | 428/36.6 |
| 5,454,157 A | 10/1995 | Ananth et al. | |
| 6,144,178 A * | 11/2000 | Hirano et al. | 318/476 |
| 6,735,044 B2 | 5/2004 | Tomioka | |
| 6,831,811 B1 * | 12/2004 | Andrikowich et al. | 360/99.22 |
| 7,236,321 B1 | 6/2007 | Fukushima | |
| 7,274,534 B1 * | 9/2007 | Choy et al. | 360/97.18 |
| 7,460,333 B2 | 12/2008 | Akamatsu et al. | |
| 7,570,454 B1 * | 8/2009 | Andrikowich et al. | 360/97.22 |
| 8,094,408 B2 * | 1/2012 | Uefune et al. | 360/99.21 |
| 2003/0081344 A1 * | 5/2003 | Fioravanti et al. | 360/75 |
| 2003/0090832 A1 * | 5/2003 | Bernett et al. | 360/97.02 |
| 2005/0219740 A1 * | 10/2005 | Repphun et al. | 360/97.02 |
| 2006/0072244 A1 | 4/2006 | Rapp | |
| 2006/0176610 A1 * | 8/2006 | Tsuda et al. | 360/97.02 |
| 2007/0171563 A1 | 7/2007 | Pit | |
| 2007/0263319 A1 * | 11/2007 | Calderon et al. | 360/97.02 |
| 2008/0068745 A1 * | 3/2008 | Uefune et al. | 360/97.02 |
| 2008/0088969 A1 * | 4/2008 | Uefune et al. | 360/97.02 |
| 2008/0174910 A1 * | 7/2008 | Hirono et al. | 360/97.02 |
| 2008/0212237 A1 * | 9/2008 | Uefune et al. | 360/254 |
| 2008/0310048 A1 | 12/2008 | Hirono et al. | |
| 2009/0162941 A1 * | 6/2009 | Winkler et al. | 436/180 |
| 2011/0038076 A1 | 2/2011 | Hayakawa et al. | |

FOREIGN PATENT DOCUMENTS

JP 2010003356 A * 1/2010 ............. G11B 33/12

* cited by examiner

*Primary Examiner* — Wayne Young
*Assistant Examiner* — Adam B Dravininkas

(57) ABSTRACT

A hermetically resealable hard-disk drive (HDD) configured for recharging with a low-density gas. The hermetically resealable HDD includes a disk enclosure (DE), a magnetic-recording disk, a head-slider, an actuator, a low-density gas, a through-hole, and a plug. The DE includes a base, and a first cover and a second cover joined to the base. The second cover is disposed above the first cover. The through-hole is configurable for injection of a low-density gas into the DE. The low-density gas, having a density less than air, substantially fills the DE. The plug is press-fitted into, and hermetically seals, the through-hole. The plug is removable to allow recharging the DE with the low-density gas; and, the through-hole is configured to accept a resealing plug to be press-fit into, and to reseal hermetically, the through-hole after recharging. A method for injecting low-density gas into, and sealing, the hermetically resealable HDD is also provided.

17 Claims, 15 Drawing Sheets

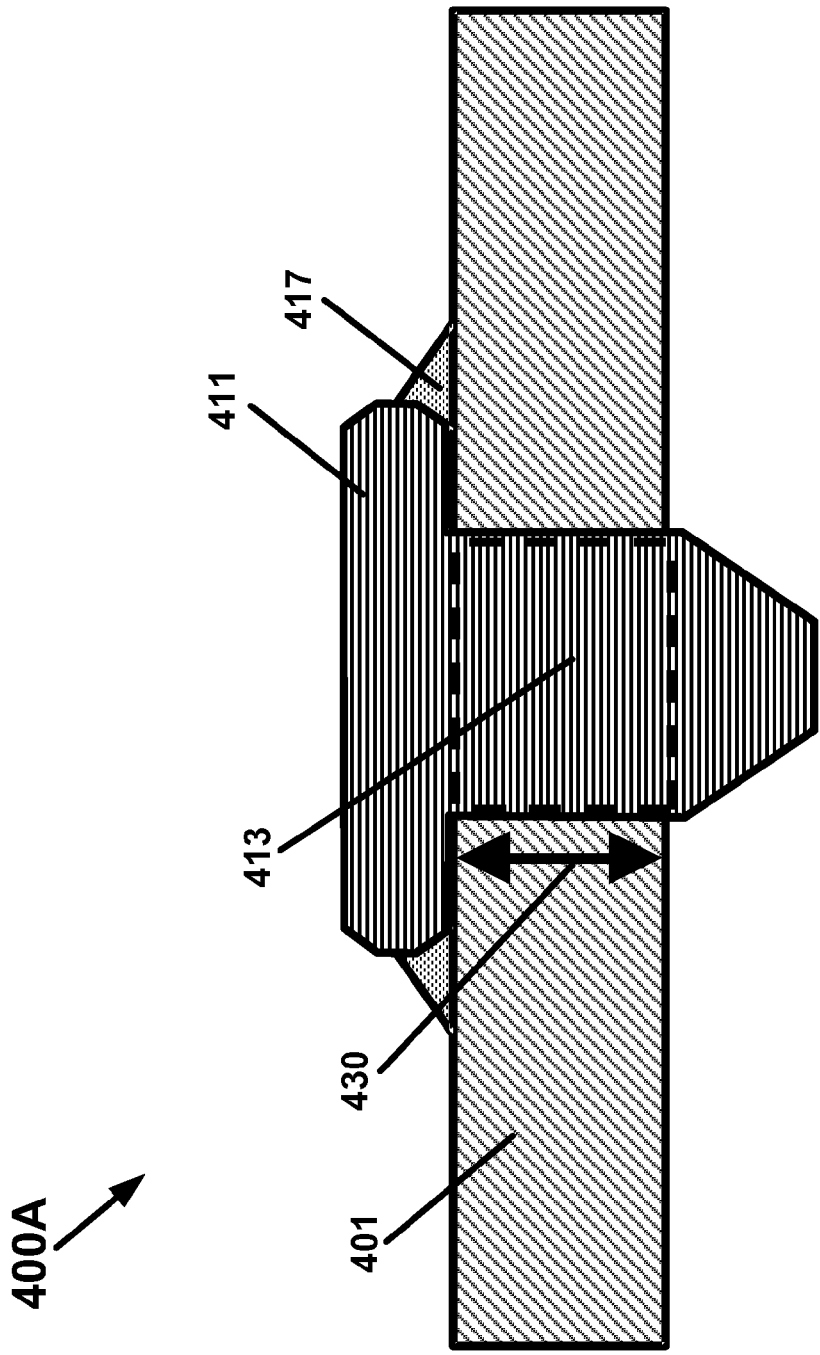

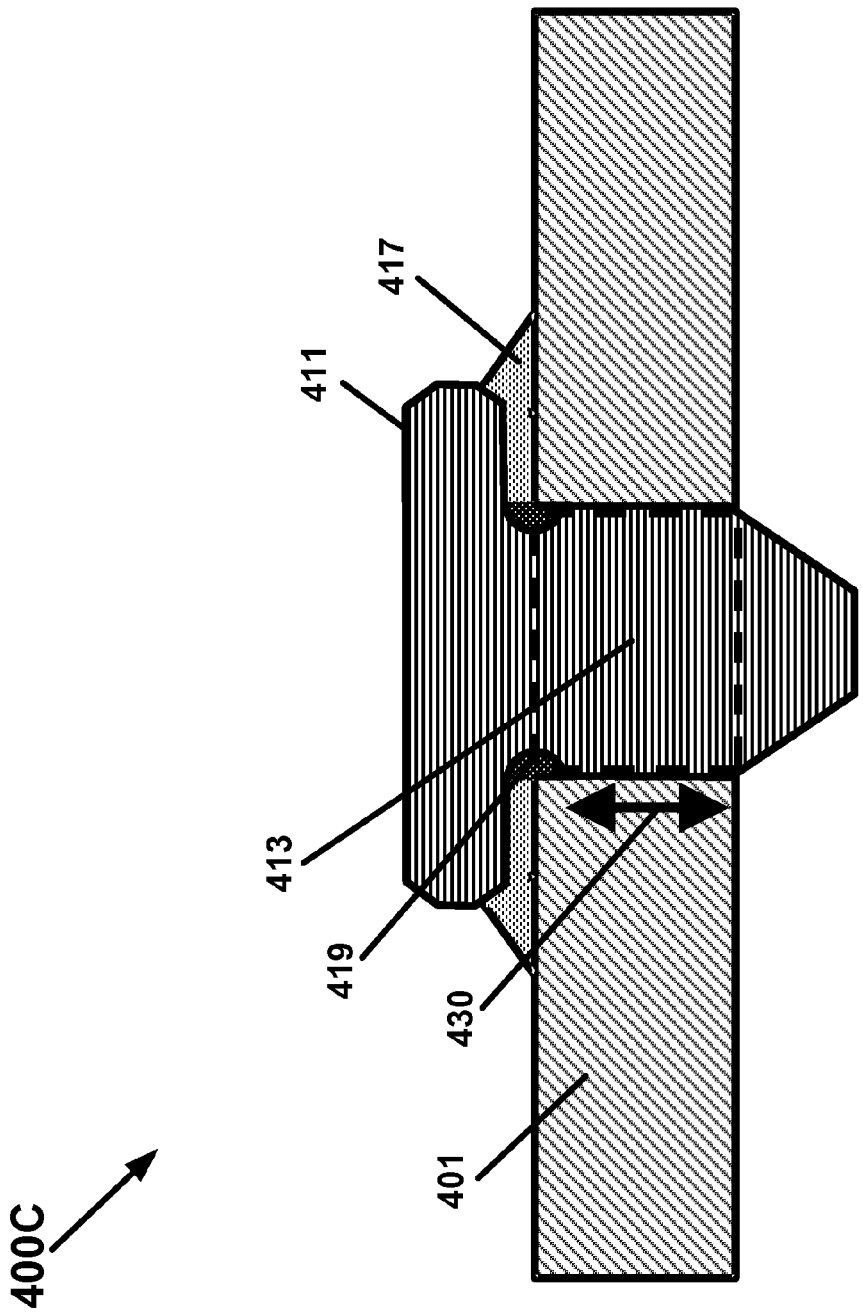

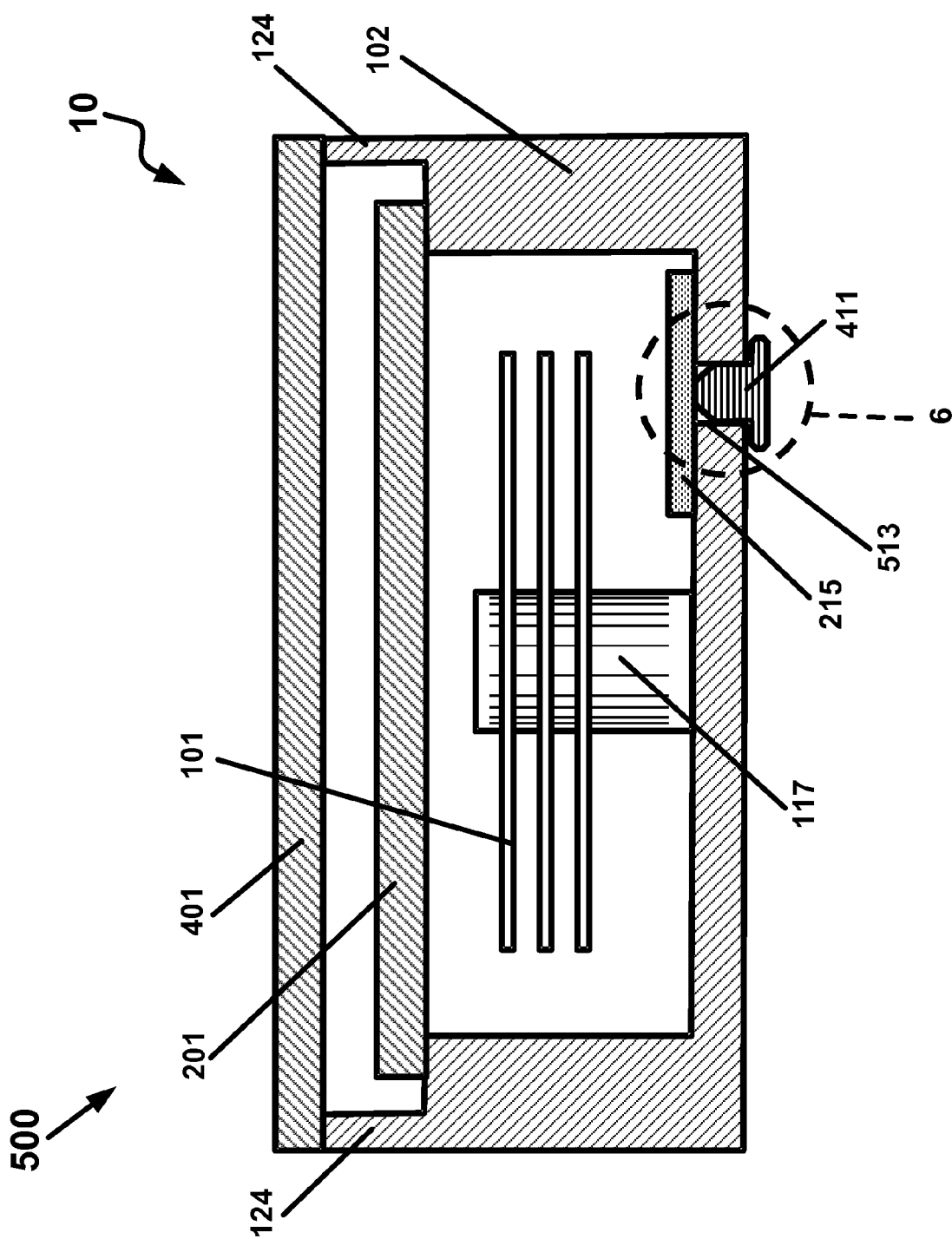

HERMETICALLY RESEALABLE HARD-DISK DRIVE CONFIGURED FOR RECHARGING WITH A LOW-DENSITY GAS

TECHNICAL FIELD

Embodiments of the present invention relate to a hermetically resealable hard-disk drive (HDD) configured for recharging with a low-density gas.

BACKGROUND

In recent years, in response to market demand for increased capacity, higher recording density, and high-speed data accessing, hard-disk drives (HDDs) spin magnetic-recording disks and actuate head gimbal assemblies (HGAs) to access data stored on magnetic-recording disks at greater speed than in the past. Consequently, mitigation of air turbulence, which buffets the magnetic-recording disks and HGAs, has arisen as an issue in the design of HDDs. Buffeting due to this turbulence can adversely affect positioning magnetic-recording heads in accessing data recorded with high recording density on a magnetic-recording disk. Since this turbulence occurs at random, estimating the magnitude and frequency of the resulting disturbance of the HGA for the swift and accurate positioning of magnetic-recording heads to access data has become complex and difficult. Moreover, the buffeting due to this turbulence may cause noise and impair the quiet operation of the HDD.

In addition, when a magnetic-recording disk is spun at high speed, the presence of the air inside the HDD causes an increase in electrical power consumption, because the air located in proximity to the magnetic-recording disk is drawn in and spun along with the magnetic-recording disk. In contrast, air located at greater distances from the magnetic-recording disk remains static so that shear forces arising between the static air and the air moving along with the magnetic-recording disk becomes a further load affecting the spin of the magnetic-recording disk. The increased electrical power consumption resulting from these shear forces is called windage loss, which becomes greater as the magnetic-recording disk spins at greater speed. To spin the magnetic-recording disk at high speed in the presence of this windage loss, a motor is utilized that has greater power output and consumes more electric power than in the absence of this windage loss. Engineers and scientists engaged in the design and production of HDDs are interested in addressing the above issues to improve the quality and reliability of the HDD product in the marketplace to satisfy customer demand, while at the same time seeking ways to reduce manufacturing costs.

SUMMARY

Embodiments of the present invention include a hermetically resealable hard-disk drive (HDD) configured for recharging with a low-density gas. The hermetically resealable HDD includes a disk enclosure (DE), a magnetic-recording disk, a head-slider, an actuator, a low-density gas, a through-hole, and a plug. The DE includes a base, and a first cover and a second cover joined to the base. The second cover is disposed above the first cover. The magnetic-recording disk is configured to rotate inside the DE. The head-slider includes a magnetic-recording head that is configured to write data to, and to read data from, the magnetic-recording disk. The actuator is configured to move the head-slider above the magnetic-recording disk, and to access the data. The through-hole is configurable for injection of a low-density gas into the DE. The through-hole may be disposed in the second cover, or alternatively, in the base. The low-density gas, having a density less than air, substantially fills the DE. The plug, which is press-fit into the through-hole, hermetically seals the through-hole. Moreover, the plug is removable to allow recharging the DE with the low-density gas; and, the through-hole is configured to accept a resealing plug to be press-fit into, and to reseal hermetically, the through-hole after the recharging. Embodiments of the present invention also include a method for injecting low-density gas into, and sealing, the hermetically resealable HDD.

DESCRIPTION OF THE DRAWINGS

The accompanying drawings, which are incorporated in and form a part of this specification, illustrate embodiments of the invention and, together with the description, serve to explain the embodiments of the present invention:

FIGS. 4A-4E are enlarged cross-sectional views of the encircled portion 4 in FIG. 3 of various example configurations of the through-hole in the second cover of the DE, in accordance with embodiments of the present invention.

FIG. 5 is a cross-sectional view, similar to that through line 3-3 of the hermetically resealable HDD of FIG. 1 shown in FIG. 3, schematically showing the structure of the disk DE of the hermetically resealable HDD including a through-hole in the base of the DE, in accordance with alternative embodiments of the present invention.

Figure 1:
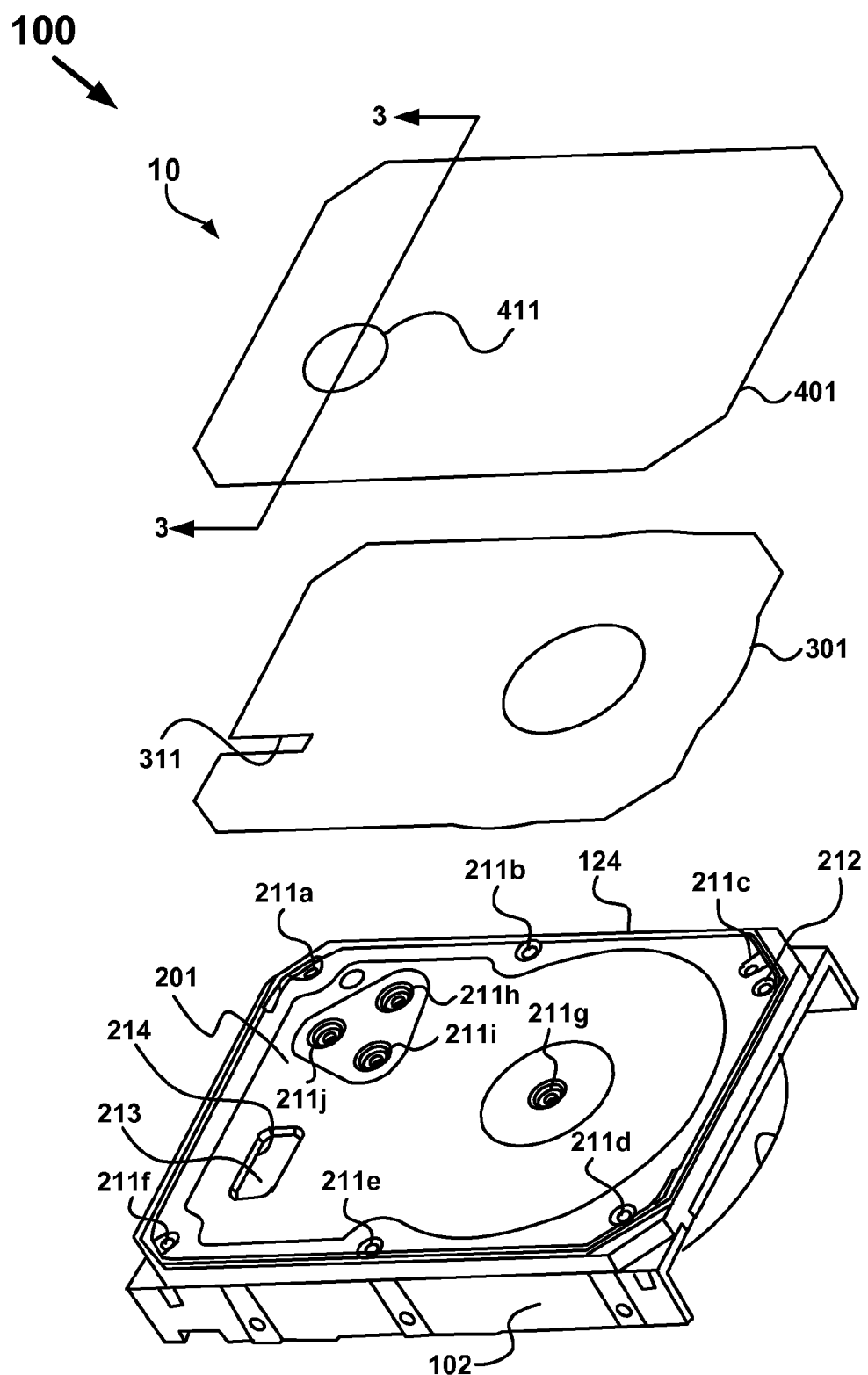
FIG. 1 is an exploded perspective view schematically depicting the structure of a hermetically resealable hard-disk drive (HDD), in accordance with embodiments of the present invention.

The drawings referred to in this description should not be understood as being drawn to scale except if specifically noted.

DESCRIPTION OF EMBODIMENTS

Reference will now be made in detail to the various embodiments of the present invention. While the invention will be described in conjunction with alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Also, throughout the drawings, like components are denoted by like reference numerals, and their repetitive description is omitted if not necessary for the sake of clarity.

Description of Embodiments of the Present Invention for a Hermetically Resealable Hard-Disk Drive Configured for Recharging with a Low-Density Gas In accordance with embodiments of the present invention, in light of the fact that the air turbulence and the windage loss are proportional to the density of the gas inside a hard-disk drive (HDD), a low-density gas instead of air may be used in the HDD to reduce the air turbulence and the windage loss. Hydrogen, helium, nitrogen, and similar gases, having a density less than air, are examples of such a low-density gas; but, helium, in particular, is effective, stable, and safe in light of the actual use. As used herein the term of art, "low-density gas," refers to a gas having a density less than air. An HDD hermetically enclosed with helium gas can overcome some of the effects of air turbulence and windage loss and can provide swift and accurate positioning of a head-gimbal assembly (HGA), electrical power savings, and quiet operation, when compared with an HDD having a disk enclosure (DE) containing air. However, helium has very small molecules and a large diffusion coefficient. Consequently, DEs commonly used to seal HDDs are not sufficiently well sealed to prevent the low-density gas from leaking out in normal use.

In accordance with embodiments of the present invention, since a low-density gas such as helium gas can easily leak out of the DE, welding or soldering are one means for sealing a HDD. If a HDD is determined to be defective during testing after assembling, some parts in the HDD may be replaced to repair the HDD. To make the repair work easier, it is desirable not to perform welding or soldering after hermetically enclosing the low-density gas until after the completion of testing.

As is known in the art, a sealing method which employs double covers may be used to address this issue. This sealing method secures a primary cover, which employs a gasket with low permeability to helium gas and is easy to disassemble and replace, to the base until during testing, attaches a secondary cover after the successful completion of testing, and joins the primary cover and the secondary cover to seal a HDD by welding or soldering. Such a double covered structure allows easier disassembly and rework after testing while helium gas is hermetically enclosed in a HDD.

In accordance with embodiments of the present invention, to prevent helium gas from leaking out of a finished HDD, the HDD is tested to determine whether helium gas is leaking, or not, through the weld joint or solder joint of the secondary cover. If a helium gas leak is detected in this test, the leak point is repaired by welding or soldering. If the leak hole is small and the leakage of helium gas is minimal, a sufficient amount of helium gas remains in the repaired HDD so that the HDD can perform as designed. On the other hand, if the leak hole is larger, or a plurality of leak points exist, so that the repair work takes a certain amount of time, the leakage of helium gas from the DE may increase. If the amount of helium gas in the DE becomes less than a specified amount for the HDD to perform as designed, helium gas may be injected into the sealed DE again. However, much work and time are involved in disassembling the DE with the secondary cover joined by soldering or welding, which is particularly so if the cover is sealed by welding. Even in a hermetically sealed HDD which has passed the leak test in manufacture, helium gas may gradually leak out of the DE during use so that the amount of the interior helium gas may be reduced to less than the specified amount. In this case too, helium gas may be reinjected into the sealed DE of the HDD to recharge the DE with a specified quantity of a low-density gas, such as helium. As used herein the term of art, "charge," refers to filling the DE with a specified quantity of a low-density gas; and, the term of art, "recharge," refers to adding, or removing, an amount of the low-density gas so that the DE is refilled with the specified quantity of the low-density gas. In addition to using a low-density gas, it is effective to adopt a negative pressure state lower than atmospheric pressure inside the HDD in order to reduce air turbulence and windage loss. Therefore, embodiments of the present invention provide a hermetically resealable HDD and a method that can easily and efficiently reenclose low-density gas, such as helium gas, at a pressure substantially less than atmospheric pressure in the DE of a HDD after completing assembly of a HDD having low-density gas previously hermetically sealed in the DE. As used herein the term of art, "substantially," when used in the phrase, "substantially less than atmospheric pressure," refers to a pressure within the interior space of a HDD that allows a head-slider to fly closer to a magnetic-recording disk than a head-slider would fly with normal variations in atmospheric pressure, for example, variations due to elevation and changes in barometric pressure.

Moreover, a hermetically sealed HDD structure allows the HDD capacity to be increased. According to Small Form Factor (SFF) standards for HDDs, for increased HDD information-storage capacity, the magnetic disks are made to be as large as possible, and as many disks as possible are provided in the DE. The basic structure of the hermetically sealed HDD filled with a low-density gas for achieving increased capacity consistent with the goals of SFF standards comprises a dual-cover structure. In order to permanently encapsulate the low-density gas, which is subjected to a final pressure adjustment, a base and a second cover are sealed together using metal bonding, or similar means. When a hermetically sealed HDD having a dual-cover structure is produced, a first cover is secured with screws; and, a reliability test is carried out. In order to permanently encapsulate the low-density gas within HDDs which have passed the test, the second cover is provided that is connected to the base by a metal bonding, for example, by laser welding the second cover to the base, such that the low-density gas is hermetically sealed within the DE. After this, a measurement is made to determine whether the second cover has finally sealed in the low-density gas, and to determine whether a HDD meeting specification has been produced.

A number of issues encountered with a hermetically sealed HDD having the dual-cover structure that are addressed by embodiments of the present invention are next described. First, a process for ensuring that the state inside the HDD, after the final hermetic sealing process, is produced in accordance with specification needs to be formulated. But, it is currently the case that there are variations within the process. In order to reduce the range of variations in the specification in terms of concentration, humidity, and pressure of the low-density gas in the hermetically sealed HDD, the final hermetic sealing process is a very complex and extensive task. It is necessary to implement a production process with a very narrow permissible range of production variations. Moreover, the structure is not expected to be suitable for mass production processes. That is, with conventional hermetically sealed HDDs including low-density gas, the structure forms a completely sealed unit. Therefore, it is necessary to adjust the concentration and humidity of the helium inside the HDD and to adjust the pressure inside the HDD in order to match the HDD specification. In view of this, the structure is such that these adjustments have to be carried out before the final hermetic sealing process. The structure is therefore one in which the process is completed during the final hermetic sealing process, without it being possible to vary the specification values which have been adjusted. This being so, the timing for adjusting the pressure inside the HDD is a significant issue in managing mass production processes.

Second, with the conventional hermetically sealed HDD having the dual-cover structure, it is not possible to check whether the low-density gas has been prevented from leaking out after the final hermetic sealing process, and to discard HDDs which do not meet specification. Or, at least, this check cannot be done without reassembling devices which have been dismantled. This is because when the leak test is carried out, the HDD is placed in a state close to vacuum; the low-density gas inside the HDD is forcibly drawn out; and, as a result, the density of the low-density gas inside the DE is reduced. In order to improve yield, even if measures are taken to deal with nonconforming HDDs by preventing leakage from the hermetically sealed portion, the density of the low-density gas inside the HDD is very likely to have already dropped below the specification value. Therefore, it is not possible to adequately prevent windage loss; and, there is a risk of a drop in the reliability of the HDD.

Third, there are also issues in relation to deformation of the cover outside of the process. Since the inside of an HDD is a completely sealed unit, the internal pressure varies due to expansion of the gas inside, because of increases in temperature. As a result of increased internal pressure, the cover deforms under the internal pressure. Thus, it is difficult to produce an HDD in accordance with SFF standards. When the inside of the HDD is at atmospheric pressure, it is difficult to make a conforming product in the operating temperature range of the HDD specification. Therefore, a sealing process and a HDD structure that allow the internal pressure to be adjusted to negative pressure, which is a pressure substantially less than atmospheric pressure, are useful.

Fourth, humidity adjustment has a great effect on the above mentioned cover deformation. Moisture content can increase due to temperature variations in the HDD, depending on the humidity environment during the final hermetic sealing process. This also causes an increase in the internal pressure. At the same time, this also has an effect on increased flutter, and HDD positioning accuracy.

Fifth, in order to adjust the low-density gas, it is also feasible for air to be mixed into the HDD until the final hermetic sealing process is complete. Thus, a filter component adjusted to a high level of filtering is useful in addition to the covers and the base. Embodiments of the present invention, which are next described, find utility in remedying the issues described above by providing a HDD having a structure in which the concentration, humidity, and pressure of the low-density gas inside the HDD can be adjusted after the low-density gas has been hermetically sealed within the DE by joining the second cover to the base.

Figure 2:
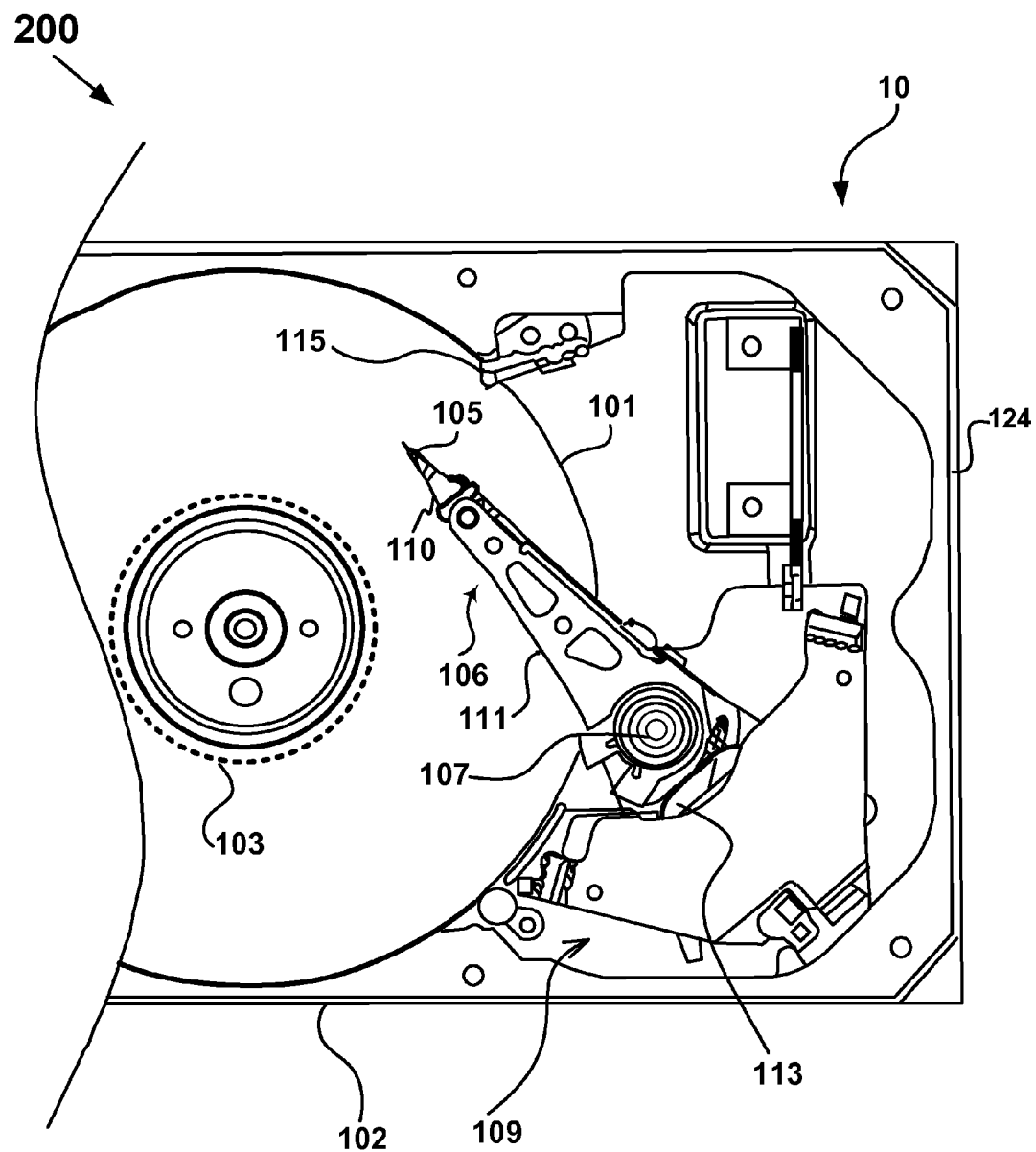
FIG. 2 is a plan view schematically depicting the internal configuration of the hermetically resealable HDD of FIG. 1, in accordance with embodiments of the present invention.

With reference now to FIGS. 1 and 2, in accordance with embodiments of the present invention, an exploded perspective view 100 and a plan view 200, respectively, depicting schematically the structure of the hermetically resealable HDD 10 are shown. In accordance with embodiments of the present invention, the hermetically resealable hard-disk drive 10 is configured for recharging with a low-density gas. In accordance with an embodiment of the present invention, the hermetically resealable HDD 10 includes a DE, a magnetic-recording disk 101, a head-slider 105, an actuator 106, a low-density gas, a through-hole, for example, through-hole 413 (see FIG. 3), or through-hole 513 (see FIG. 8), and a plug 411. The DE, in which gas with lower density than air, referred to herein as low-density gas, is hermetically sealed. The low-density gas substantially fills the DE. As used herein the term, "substantially," as used in the phrases, "substantially fills," or "substantially filling," with respect to the low-density gas and the DE means that the principal constituent of gaseous molecular species that fills the DE is the low-density gas. The DE includes a base 102, a first cover 201, which may be referred to herein as a primary cover, an adhesive layer 301, and a second cover 401. The first cover 201 and a second cover 401 are joined to the base 102; and, the second cover 401 is disposed above the first cover 201. As configured in FIG. 1, the through-hole 413 (see FIG. 3) is disposed in the second cover 401. As shown in FIG. 1, line 3-3 provides the trace of a reference plane used in the subsequent discussion of the arrangement of the plug 411 in through-hole 413 shown in FIG. 3. Alternatively, the through-hole 513 (see FIG. 8) may be disposed in the base 102. The through-hole 413 (see FIG. 3) or through-hole 513 (see FIG. 8), is configurable for injection of the low-density gas into the DE. The plug 411 is press-fitted into and hermetically seals the through-hole, for example, through-hole 413 (see FIG. 3), or through-hole 513 (see FIG. 8). The plug 411 is removable to allow recharging the DE with the low-density gas; and, the through-hole, for example, through-hole 413 (see FIG. 3), or through-hole 513 (see FIG. 8), is configured to accept a resealing plug similar to plug 411 to be press-fit into, and to reseal hermetically the through-hole, after recharging the DE with low-density gas.

With further reference to FIG. 1, in accordance with embodiments of the present invention, the first cover 201 is secured to the base 102 with screws with a gasket (not shown in FIG. 1) interposed between the first cover 201 and the base 102. FIG. 1 shows screw holes 211a to 211f of the first cover 201. In addition, in the first cover 201, screw holes 211g to 211j for a spindle motor (SPM) 103 and an actuator 106 (see FIG. 2) are formed. Within the interior space formed by the base 102 and the first cover 201, components constituting a head-disk assembly (HDA) are housed. A plurality of screw holes including the screw holes 211a to 211j in the first cover 201 are covered with seals (not shown). Further, a through-hole 213 to inject low-density gas into the interior space formed by the base 102 and the first cover 201 may be formed in depression 214, by way of example without limitation thereto.

With further reference now to FIG. 2, in accordance with an embodiment of the present invention, a plan view 200 of the hermetically resealable hard-disk drive of FIG. 1 is shown. FIG. 2 schematically depicts the internal configuration of component parts of the hermetically resealable HDD 10 within the interior space of the DE formed by the first cover 201 and the base 102. Operation of the components in the interior space is controlled by control circuits on a control circuit board (not shown). The components of the hermetically resealable HDD 10, viz., a magnetic-recording disk 101, a head-slider 105, and an actuator 106, are housed in the base 102. The magnetic-recording disk 101 is configured to rotate inside the DE. The head-slider 105 includes a magnetic-recording head that is configured to write data to, and to read data from, the magnetic-recording disk 101, and a slider on which the magnetic-recording head is formed. The actuator 106 is configured to move the head-slider 105 above the magnetic-recording disk 101, and to access the data. Thus, the head-slider 105 may access the magnetic-recording disk 101 that serves to store the data. The magnetic-recording head includes a write element for converting electric signals into magnetic fields and/or a read element for converting magnetic fields from the magnetic-recording disk 101 into electric signals.

With further reference to FIG. 2, in accordance with an embodiment of the present invention, an actuator 106 supports the head-slider 105 and is driven by a voice coil motor (VCM) 109 to rotate about a pivot shaft 107. The combined assemblage of the actuator 106 and the VCM 109 provides a moving mechanism for moving the head-slider 105. The actuator 106 includes the following components: suspension 110, an arm 111, and a voice coil 113, which are connected in this order in the longitudinal direction from the distal end of the actuator 106 where the head-slider 105 is placed. The VCM 109 consists of elements such as a voice coil 113 and a voice-coil magnet (not shown). The suspension 110 and the head-slider 105 constitute a head gimbal assembly (HGA). A SPM 103 fixed to the base 102 spins the magnetic-recording disk 101 at a specific angular rate. To read data from, or write data to, the magnetic-recording disk 101, the actuator 106 moves the head-slider 105 to the data area above the surface of the magnetic-recording disk 101. The pressure induced by the air viscosity between the air bearing surface (ABS) of the slider and the spinning magnetic-recording disk 101 balances the load applied by the suspension 110 to the slider in the direction of the magnetic-recording disk 101, which determines a fly height at which the head-slider 105 flies over the magnetic-recording disk 101. The fly-height can be reduced by lowering the pressure of the low-density gas inside of the interior space of the DE, which permits recording information at higher areal density. When the magnetic-recording disk 101 stops spinning, the actuator 106 moves the head-slider 105 from a data area to a ramp 115. On the other hand, embodiments of the present invention may be applied to a contact start and stop (CSS) scheme where the head-slider 105 is moved to a parking location in a zone provided near the inner diameter of the magnetic-recording disk 101 where the head-slider 105 does not write, or read, data. The hermetically resealable HDD 10 may include one or more single-sided, or double-sided, magnetic-recording disks.

With reference once again to FIG. 1, in accordance with an embodiment of the present invention, the DE of the hermetically resealable HDD 10 includes a base 102 for housing the above-described components, a first cover 201 for covering a top opening of the base 102, an second cover 401 disposed so as to cover the first cover 201, and an adhesive layer 301, by way of example without limitation thereto, which is provided between the first cover 201 and the second cover 401 to bond the first cover 201 to the second cover 401. The periphery of the adhesive layer 301 is smaller than the periphery of the second cover 401 and periphery of the first cover 201. By way of example without limitation thereto, a slit 311 may be formed in the adhesive layer 301. The adhesive layer 301 bonds the second cover 401 to the first cover 201. Since the second cover 401 is fixed by welding for example, and the size of the DE is regulated by specification, the second cover 401 is usually formed thinner and its strength is low. Accordingly, the adhesive layer 301 reinforces the second cover 401 by bonding the second cover 401 to the first cover 201. In accordance with one embodiment of the present invention, low-density gas, with density less than air, is enclosed in the sealed interior space, which suppresses turbulence and windage loss caused by the spin of the magnetic-recording disk 101 and the rotation of the actuator 106. The low-density gas, which is used in the hermetically resealable HDD 10, may be hydrogen gas, nitrogen gas, or helium gas, but helium gas is more effective, stabler, and safer. The subsequent description is based on the use of helium gas, by way of example and without limitation thereto.

With further reference to FIG. 1, in accordance with an embodiment of the present invention, an hermetically resealable HDD 10 includes a removable first cover 201 and an second cover 401 to prevent leakage of helium gas, which provides for easier rework during manufacturing and effectively prevents helium gas from leaking out of the hermetically resealable HDD 10 in the final product. In manufacturing the hermetically resealable HDD 10, the head-slider 105 is manufactured; and the suspension 110 is manufactured independently of the head-slider 105. The head-slider 105 is bonded to the suspension 110 to manufacture an HGA. Then, an arm 111 and a voice coil 113 are secured to the HGA to manufacture a head stack assembly (HSA), which is an assembly of the actuator 106 and the head-slider 105. After mounting components such as an SPM 103 and a magnetic-recording disk 101 in addition to the manufactured HSA within the base 102, the first cover 201 is secured to the base 102 with screws.

Figure 3:
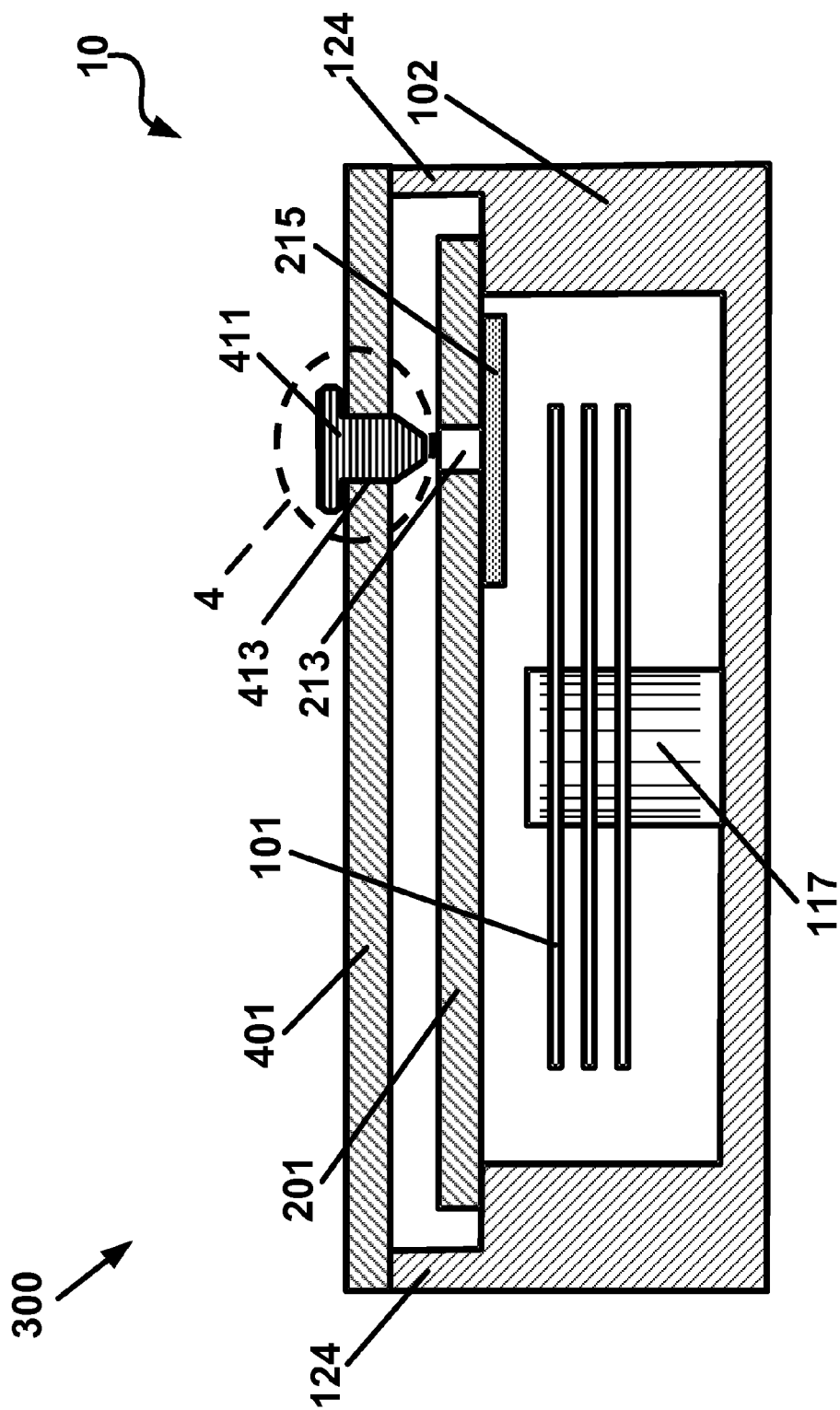
FIG. 3 is a cross-sectional view, through line 3-3 of FIG. 1, schematically showing the structure of a disk enclosure (DE) of the hermetically resealable HDD including a through-hole in the second cover of the DE, in accordance with embodiments of the present invention.

With reference now to FIG. 3, in accordance with an embodiment of the present invention, a cross-sectional view 300, through line 3-3 of FIG. 1, of the structure of the DE of the hermetically resealable HDD 10 is shown. FIG. 3 schematically depicts the structure of the through-hole 413 in the second cover 401 of the DE of the hermetically resealable HDD 10. In FIG. 3, most of the components in the base 102 are omitted, except for magnetic-recording disks, for example, magnetic-recording disk 101, and spindle 117 upon which the magnetic-recording disks are mounted, so as not to obscure description of embodiments of the present invention. The first cover 201 is made of a plate material, for example, stainless steel, aluminum, brass, or similar materials. A ring-shaped gasket (not shown) between the first cover 201 and the base 102 may be provided on the base 102 so as to surround the interior space of the base 102, forming a structure capable of temporarily keeping helium gas hermetically within an interior space between the base 102 and the first cover 201. After securing the first cover 201 with screws (not shown), helium gas is hermetically enclosed in the interior space formed by the first cover 201 and the base 102. The helium gas is injected within the base 102 through the through-hole 213 formed in the first cover 201. For example, the above-described finished assembly may be placed in a chamber; the chamber may be evacuated and subsequently filled with helium gas to allow the helium gas to be injected within the hermetically enclosed space. The preceding procedure introduces helium gas into the interior space through the through-hole 213 in the first cover 201 and the interior space of the assembly is filled, or in other words charged, with helium gas. As used herein, the term of art "hole" may be used interchangeably with the term of art "through-hole." The assembly may then be removed from the chamber; and the through-hole 213 in the first cover 201 may be covered by a temporary seal in the form of a sealing tape (not shown). Thus, helium gas may be temporarily enclosed in the hermetic interior space between the base 102 and the first cover 201.

With further reference to FIG. 3, in accordance with an embodiment of the present invention, a control circuit board may be mounted on the assembly containing the interior space formed by the first cover 201 and the base 102 filled with the helium gas. Subsequently, servo writing and operational testing of the HDD may be performed before fixing the second cover 401. Accordingly, during servo writing and operational testing of the HDD, the second cover 401 and the adhesive layer 301 may not yet be mounted to the assembly. The operational testing of the HDD determines whether or not there are any defective parts present in the HDD that have not met the specification and levels of performance. If any defective part is detected, the HDD is returned to the prior assembly operation, the previously attached first cover 201 is removed, and repair work, or rework, may be performed that replaces the defective part. Since the first cover 201 is merely secured with screws, it may be easily removed, so that the rework process is not impeded.

With further reference to FIG. 3, in accordance with an embodiment of the present invention, on the other hand, a hermetically resealable HDD 10 which has met specification and levels of performance during the testing operation may be returned to the assembly operation, whereupon the adhesive layer 301 (not shown in FIG. 3, see FIG. 1) and the second cover 401 are mounted to the assembly. Before joining the second cover 401, the temporary seal covering the through-hole 213 in the first cover 201 is removed, which provides that a leak test performed after joining the second cover 401 to the assembly is effective. The joint between the base 102 and the second cover 401 could be locations from which helium gas in the DE is likely to leak. To seal up a leak at such a location, the second cover 401 is laser welded, or alternatively soldered, to the top surface of a ridge 124 formed on a wall of the base 102 shown in FIG. 1. A welded joint is formed between the second cover 401 and the ridge 124.

With further reference to FIGS. 1 and 3, in accordance with an embodiment of the present invention, the ridge 124 surrounds the peripheries of the top opening of the base 102 and the first cover 201, and the joint between the second cover 401 and the ridge 124 is formed so as to surround them. Joining the second cover 401 provides a sealed space within the DE. In laser welding or soldering, the material of the base 102 and the second cover 401 may be selected taking account of durability, reliability, and cost. For example, a base 102 formed by aluminum die-casting may be selected and an aluminum second cover 401 shaped by pressing or cutting may be selected. Alternatively, a base 102 formed by cold forging an aluminum alloy containing a relatively small amount of copper and magnesium may be selected and an aluminum second cover 401 shaped by pressing or cutting may be selected.

With further reference to FIGS. 1 and 3, in accordance with an embodiment of the present invention, during the manufacture of a hermetically resealable HDD 10, after the second cover 401 is joined to the base 102, a leak test on a hermetically resealable HDD 10 may be performed. In particular, a helium gas-leak test from the joint between the second cover 401 and the base 102 may be performed. The leak test uses a helium gas detector. A portion of the helium gas enclosed in the space between the base 102 and the first cover 201 may escape through the through-hole 213 of the first cover and stays between the second cover 401 and the first cover 201. If any defect is present at the joint located at the second cover 401, helium gas may be found to leak from that location. Upon detection of a helium gas leak with the helium gas detector, the leakage point may be sealed by soldering or welding. If the amount of leakage that has occurred prior to when the leak point has been repaired is small, this is acceptable. On the other hand, if the helium gas leakage from the DE is larger, the amount of helium gas in the DE decreases to less than a specified amount so that the hermetically resealable HDD 10 may show abnormal operation, or not be able to deliver the specified performance. In such cases, it is necessary to reinject helium gas and reseal the DE of the hermetically resealable HDD 10. Thus, in accordance with one embodiment of the present invention, the manufacturing method of a hermetically resealable HDD 10 reinjects helium gas whenever either helium gas leaks and the leak point is repaired, or the helium gas leakage is large and the leak point is repaired. Whether or not a specified amount of helium gas remains in the DE may be determined by measuring the electric power used in operation of the SPM 103, or the actuator 106, during the testing operation of the repaired hermetically resealable HDD 10.

With further reference to FIGS. 1 and 3, in accordance with an embodiment of the present invention, during the manufacture of an HDD, a new through-hole which penetrates the DE from the outside to the inside may be created at a reinjection point including a location where a helium-gas reinjection through-hole is to be formed. Helium gas may be reinjected into the DE through the through-hole, for example, through-hole 413. As shown in FIG. 3, the hermetically resealable HDD 10 further includes a second through-hole 213 in the first cover 201; the second through-hole 213 is configured for injection, or re-injection, of the low-density gas into the interior space of the DE. Moreover, the hermetically resealable HDD 10 may further include a filter 215 disposed over an orifice of the second through-hole 213, the filter 215 configured to filter the low-density gas admitted to the interior space of the DE. After helium gas reinjection, the through-hole 413 is press-fitted with the plug 411. Thus, helium gas may be easily and hermetically resealed in the DE without disassembling the DE after joining the second cover 401.

For example, hermetically resealing helium gas may be accomplished by the following method: create a helium-gas reinjection through-hole 413 in the second cover 401; place the HDA with the helium-gas reinjection through-hole 413 within a chamber; evacuate the chamber; and then fill the chamber with helium gas. Thus, helium gas is injected from the helium-gas reinjection through-hole 413 into the DE of the HDA. To increase the fill rate of helium gas, the evacuation and filling of the chamber with helium gas may be repeated several times. After completing helium gas reinjection, the plug 411 may be attached to the HDA to seal the helium-gas reinjection through-hole 413, after the HDA has been removed from the chamber, or alternatively, while the HDA still remains within the chamber.

In accordance with another embodiment of the present invention, hermetically resealing helium gas in the DE may also be accomplished as follows. Throughout the following discussion, by way of example, the through-hole may be identified with through-hole 413 in the second cover 401, without limitation thereto, as the through-hole may also be through-hole 513 in the base 102. A gas reinjection tool may be used, which is next described. The re-injection tool includes an aspiration cup, a rubber seal, an insertion rod, a short nipple, and a gas supply tube. The aspiration cup has an open end for facing the portion of the DE where the through-hole 413 is located. The insertion rod faces the through-hole 413; and, the end of the insertion rod is configured to hold the top portion of the plug 411 oriented so that the shank of the plug 411 may be press-fitted into the through-hole 413. The end of the insertion rod that holds the plug 411 may include a magnetic chuck, or magnet, to magnetically hold, for example, a plug 411 made from a magnetic material such as ferrous steel. The aspiration cup has a second opening opposite the open end through which the rod enters the aspiration cup. The aspiration cup has an approximately circularly cylindrical shape and the axis of the insertion rod is disposed at about the central axis of the aspiration cup such that the insertion rod may move up and down like a piston inside of the aspiration cup. In one embodiment of the present invention, the aspiration cup has a larger inside diameter than the outside diameter of the insertion rod such that an annular cavity is defined between the insertion rod's outer surface and the inner surface of the aspiration cup. The rubber seal is disposed over around the periphery of the open end of the aspiration cup such that when the open end of the aspiration cup engages the surface of the hermetically resealable HDD 10 proximate to the location of the through-hole 413, the rubber seal is configured to make an air-tight seal between the aspiration cup and the surface of the hermetically resealable HDD 10. The portion of the insertion rod that passes through the second opening is also equipped with a seal such that when the aspiration cup engages the surface of the hermetically resealable HDD 10 the annular cavity becomes sealed from the surrounding environment on the outside of the aspiration cup. The short nipple is attached at the side wall of the aspiration cup and provides communication between the annular cavity inside the aspiration cup and the gas supply tube to which the short nipple is attached.

In accordance with embodiments of the present invention, by way of example without limitation thereto, the gas reinjection tool may be used as follows. The aspiration cup engages the surface of the hermetically resealable HDD 10 proximate to the location of the through-hole 413, aligned so that the shank of the plug 411 is aligned with the sides of the through-hole 413. A partial vacuum is drawn on the gas supply tube such that the rubber seal at the open end of the aspiration cup seals the annular cavity inside of the aspiration cup from the surrounding environment on the outside of the aspiration cup. Low-density gas is then admitted into the annular cavity through the aspiration tube to recharge the interior space of the hermetically resealable HDD 10. Suitable gauges for measuring the pressure of the low-density gas, the humidity of the low-density gas, and the amount of low-density gas used to recharge the hermetically resealable HDD 10 may be coupled to the aspiration cup such that the these parameters may be controlled during recharging the hermetically resealable HDD 10 with low-density gas, for example, helium. For example, in accordance with an embodiment of the present invention, the pressure of the low-density gas inside the DE may be made substantially less than atmospheric pressure. Thus, a pressure in the interior space of the hermetically resealable HDD 10 may be adjusted to a target pressure; for example, the target pressure may be about 67 kilopascal (kPa). When the specified pressure, amount, and humidity of low-density gas are achieved, the insertion rod may be depressed to press-fit the plug 411 into the through-hole 413, to hermetically reseal the hermetically resealable HDD 10. This operation may be performed repeatedly by removing a previously press-fitted plug, for example, plug 411, provided that a resealing plug similar to plug 411 has a second diameter larger than a diameter of the previous plug, for example, plug 411, removed from the through-hole 413. The circle 4 identifies a portion of the DE detailing arrangements of the plug 411 in the through-hole 413, which are next described.

Figure 4B:
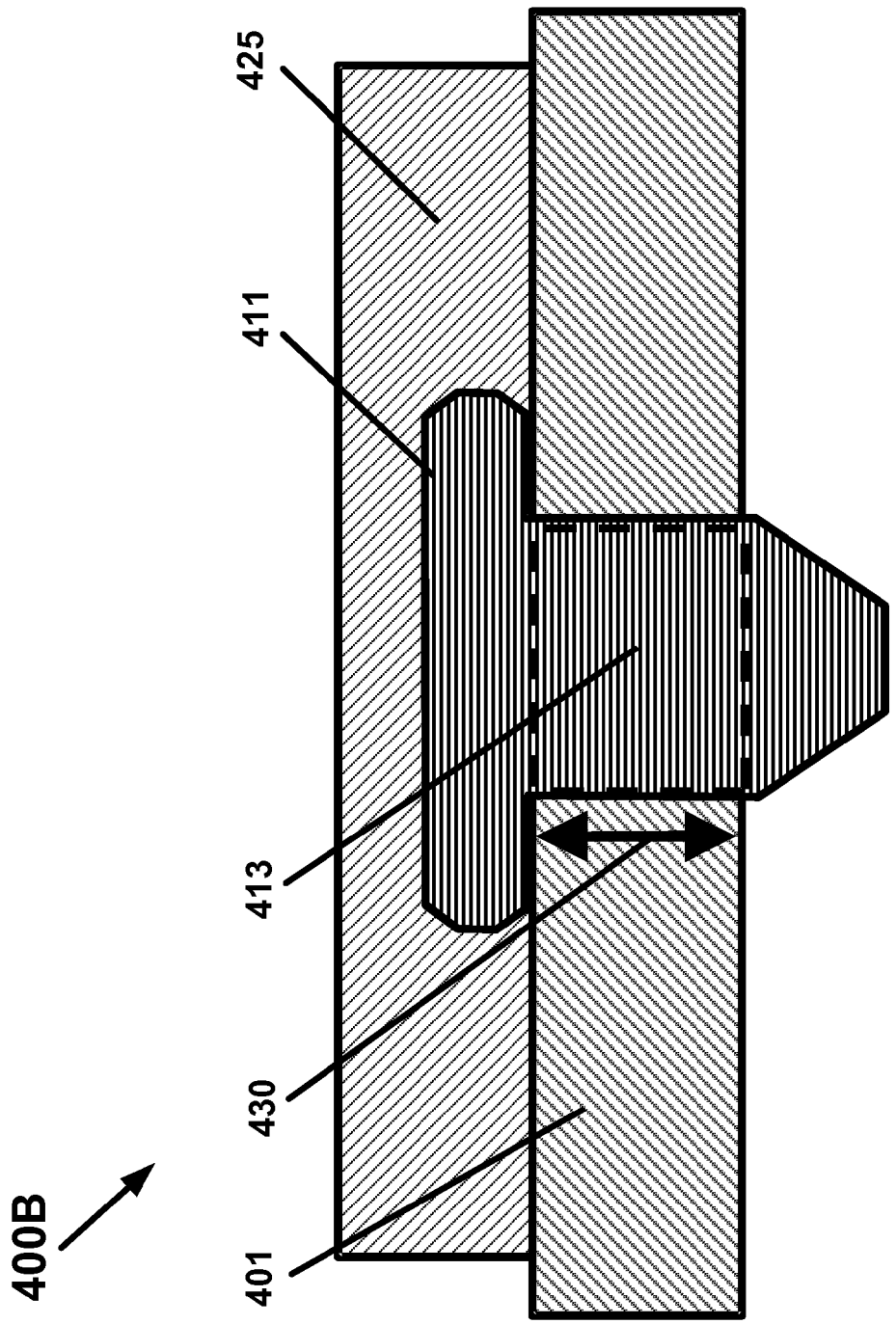
Figure 4D:
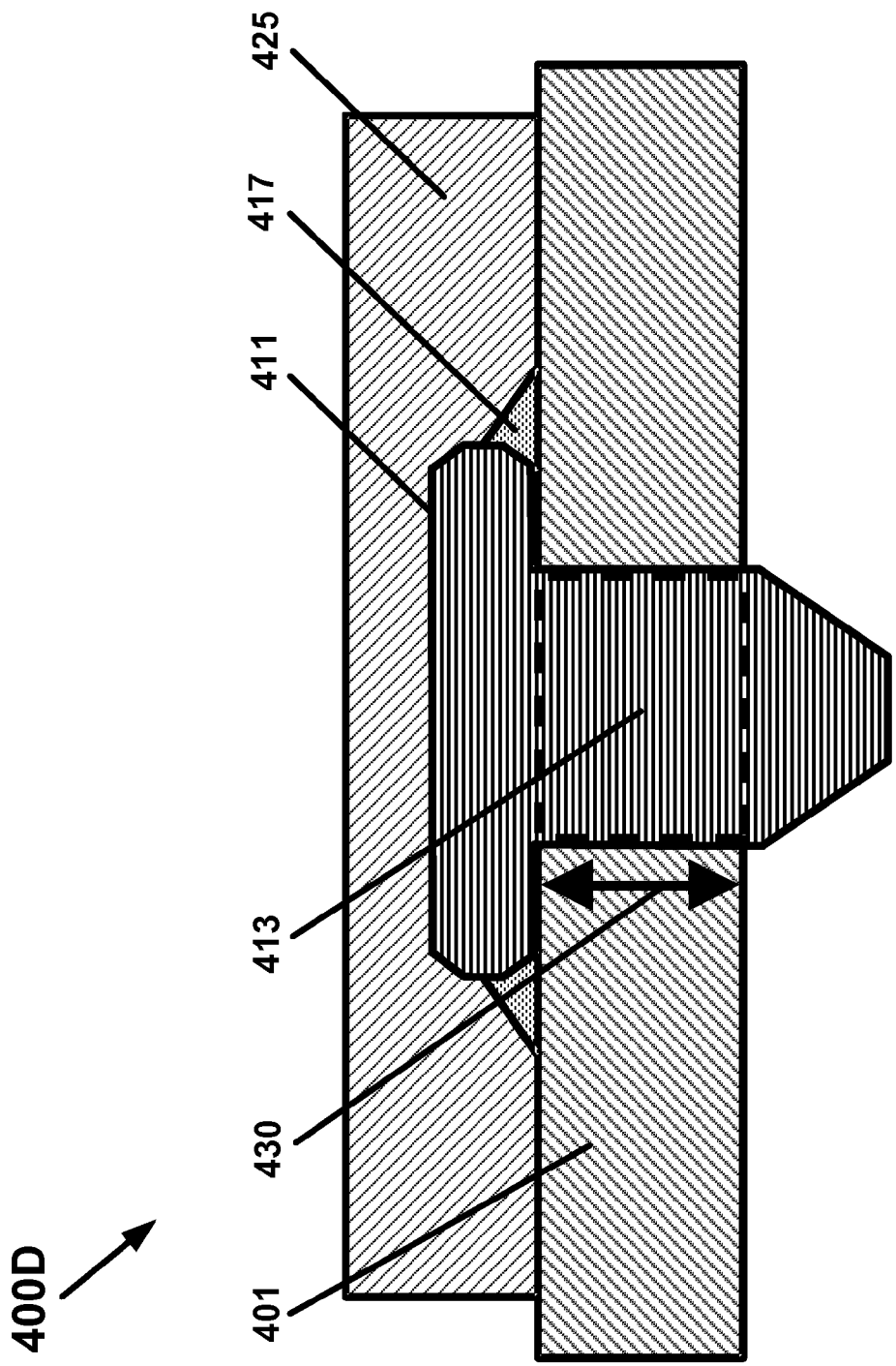
Figure 4E:
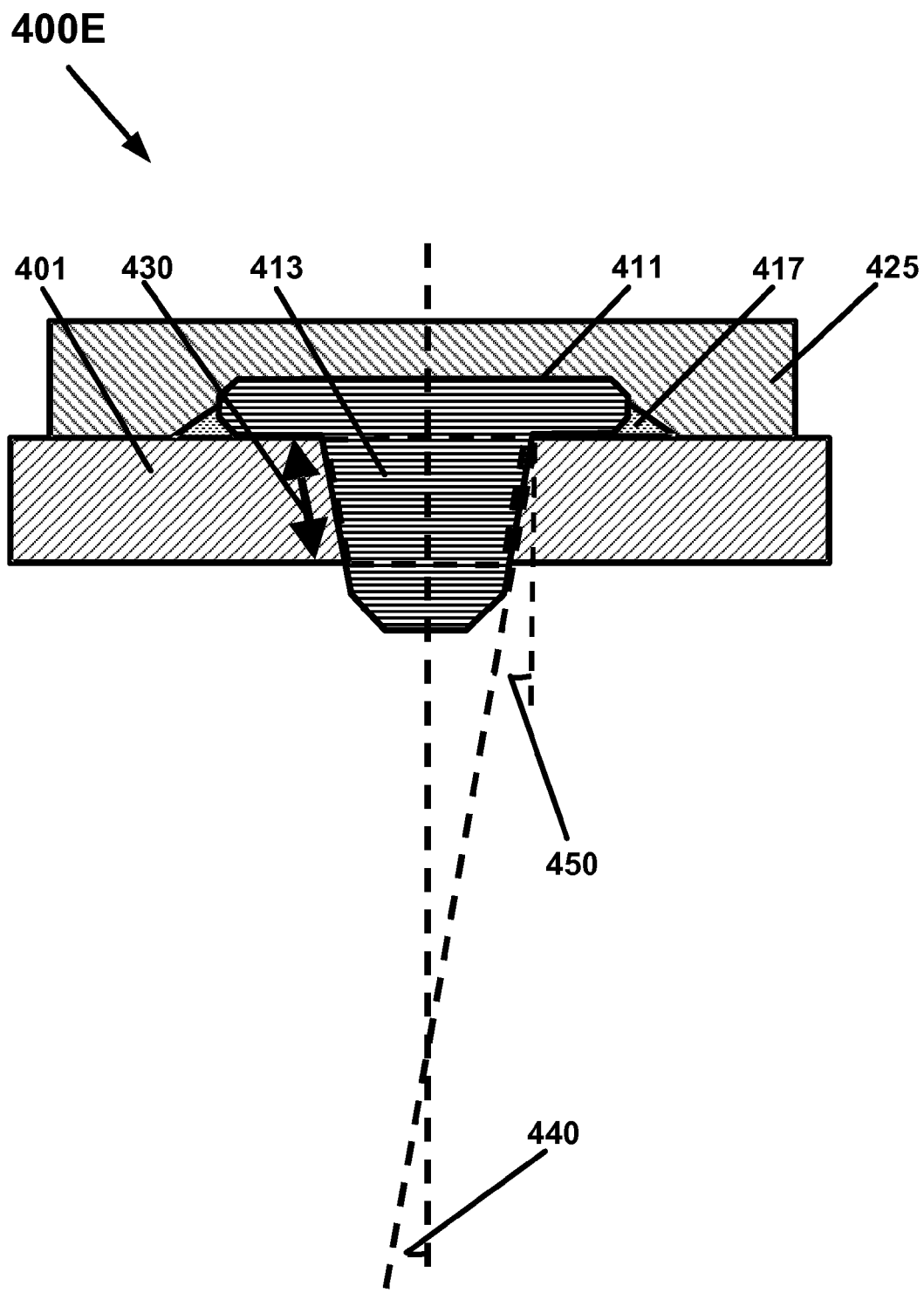

With reference now to FIGS. 4A-4E, in accordance with alternative embodiments of the present invention, cross-sectional views 400A-400D of the encircled portion 4 in FIG. 3 are shown. FIGS. 4A-4E show various example configurations of the through-hole 413 (outlined by dashed lines) in the second cover 401 of the DE of the hermetically resealable HDD 10. As shown in FIG. 4A, in accordance with one embodiment of the present invention, the plug 411 is coated with a sealing compound 417; and, the sealing compound 417 is configured to prevent leakage of the low-density gas out of the DE. By way of example without limitation thereto, the sealing compound 417 may be selected from the group consisting of an adhesive, and an oil. As shown in FIG. 4B, in accordance with another embodiment of the present invention, the hermetically resealable HDD 10 may further include a sealing tape 425 disposed over the plug 411 and a portion of an exterior surface of the DE adjacent to a periphery of the plug 411 such that the sealing tape 425 hermetically seals the plug 411 to the through-hole 413. By way of example without limitation thereto, the sealing tape 425 may include aluminum tape. As shown in FIG. 4C, in accordance with another embodiment of the present invention, the hermetically resealable HDD 10 may further include a sealing-compound reservoir 419 containing sealing compound 417, in communication with the sealing compound 417 coating the plug 411, and configured to replenish the sealing compound 417 coating the plug 411. As shown in FIG. 4C, the sealing-compound reservoir 419 may include a recess in the plug 411 configured to accommodate reserve amounts of the sealing compound 417. As shown in FIG. 4D, in accordance with yet another embodiment of the present invention, the plug 411 is coated with the sealing compound 417; and, the hermetically resealable HDD 10 may further include the sealing tape 425 disposed over the plug 411 and a portion of an exterior surface of the DE adjacent to a periphery of the plug 411 such that the sealing tape 425 hermetically seals the plug 411 to the through-hole 413. As shown in FIG. 4E, in accordance with yet another embodiment of the present invention, the shank of the plug 411 is gradually tapered along the contact length 430. The taper angle 440 of the plug 411 is less than 3 degrees to easily insert the plug 411 into the through-hole 413 and to keep the plug 411 held tightly in the through-hole 413. The taper angle 440 of the plug 411 is defined herein as the lesser angle between a tangent line lying on surface of the shank of the plug 411 and a line parallel to the central axis of the shank of the plug 411. Corresponding, the through-hole 413 is tapered with a taper angle 450 of the through-hole 413 to accept the plug 411 that is tapered. Thus, the taper angle 440 of the plug 411 is about equal to the taper angle 450 of the through-hole 413. The taper angle 440 of the through-hole 413 is defined herein as the lesser angle between a tangent line lying on surface of the side-wall of the second cover 401 that defines the through-hole 413 and a line parallel to the central axis of the through-hole 413. As shown in FIG. 4E, a line parallel to the central axis of the through-hole 413 is about the same as a line parallel to the central axis of the shank of the plug 411, when the plug 411 is inserted into the through-hole 413. As shown in FIGS. 4A-4E, the longer the length 430 of the contact region between the shank of the plug 411 and the side-walls off the second cover 401 defined by the through-hole 413, the better the resistance of the seal provided by the press-fit plug 411 to out-diffusion and escape of the low-density gas from the interior space of the hermetically resealable HDD 10. Therefore, in accordance with an embodiment of the present invention, the length 430 of the contact region between the shank of the plug 411 and the side-walls off the second cover 401 defined by the through-hole 413 may be increased by burring the through-hole 413, increasing the thickness of the second cover 401, or increasing the length of the shank portion of the plug to equal, or exceed, the length of the through-hole 413.

With reference now to FIG. 5, in accordance with an embodiment of the present invention, a cross-sectional view 500, similar to that through line 3-3 of FIG. 1, of the structure of the DE of the hermetically resealable HDD 10 is shown. FIG. 5 schematically depicts the structure of a through-hole 513 in the base 102 of the DE of the hermetically resealable HDD 10. In FIG. 5, most of the components in the base 102 are omitted, except for magnetic-recording disks, for example, magnetic-recording disk 101, and spindle 117 upon which the magnetic-recording disks are mounted, so as not to obscure description of embodiments of the present invention. Similar to as described in FIGS. 1-3, the ridge 124 surrounds the peripheries of the top opening of the base 102 and the first cover 201, and the joint between the second cover 401 and the ridge 124 is formed so as to surround them. In accordance with embodiments of the present invention, the hermetically resealable HDD 10 is configured as previously described above, except that the plug 411 is press-fitted into and hermetically seals the through-hole 513 in the base 102 of the hermetically resealable HDD 10. The plug 411 is removable to allow recharging the DE with the low-density gas; and, the through-hole 513 is configured to accept a resealing plug similar to plug 411 to be press-fit into, and to reseal hermetically, through-hole 513 after recharging. As shown in FIG. 5, the hermetically resealable HDD 10 further includes a filter 215 disposed over an interior orifice of the through-hole 513; and, the filter 215 is configured to filter the low-density gas admitted to an interior space of the DE. The circle 6 identifies a portion of the DE detailing arrangements of the plug 411 in the through-hole 513, which are next described.

Figure 6A:
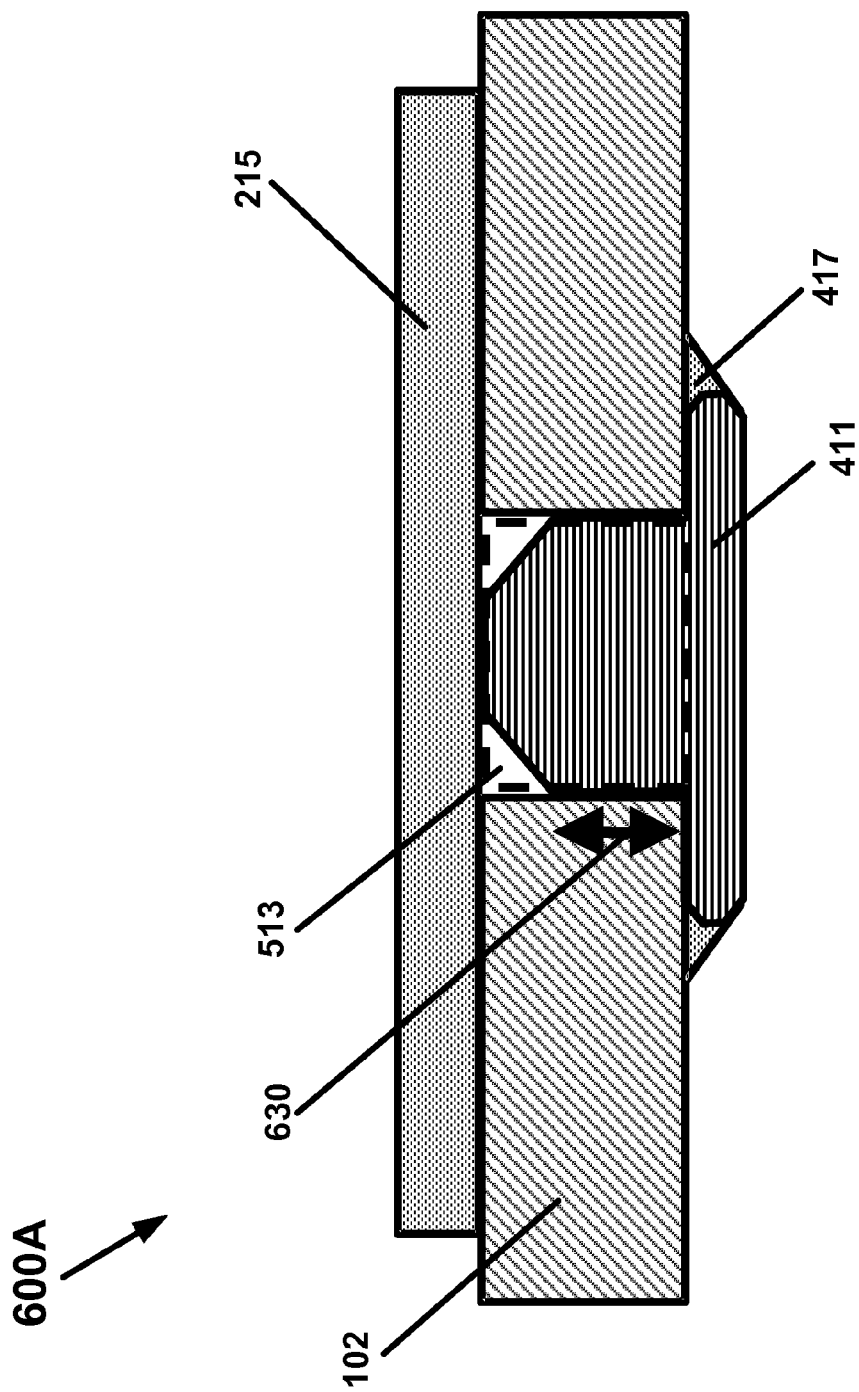
FIGS. 6A-6D are enlarged cross-sectional views of the encircled portion 6 in FIG. 5 of various example configurations of the through-hole in the base of the DE, in accordance with embodiments of the present invention.
Figure 6B:
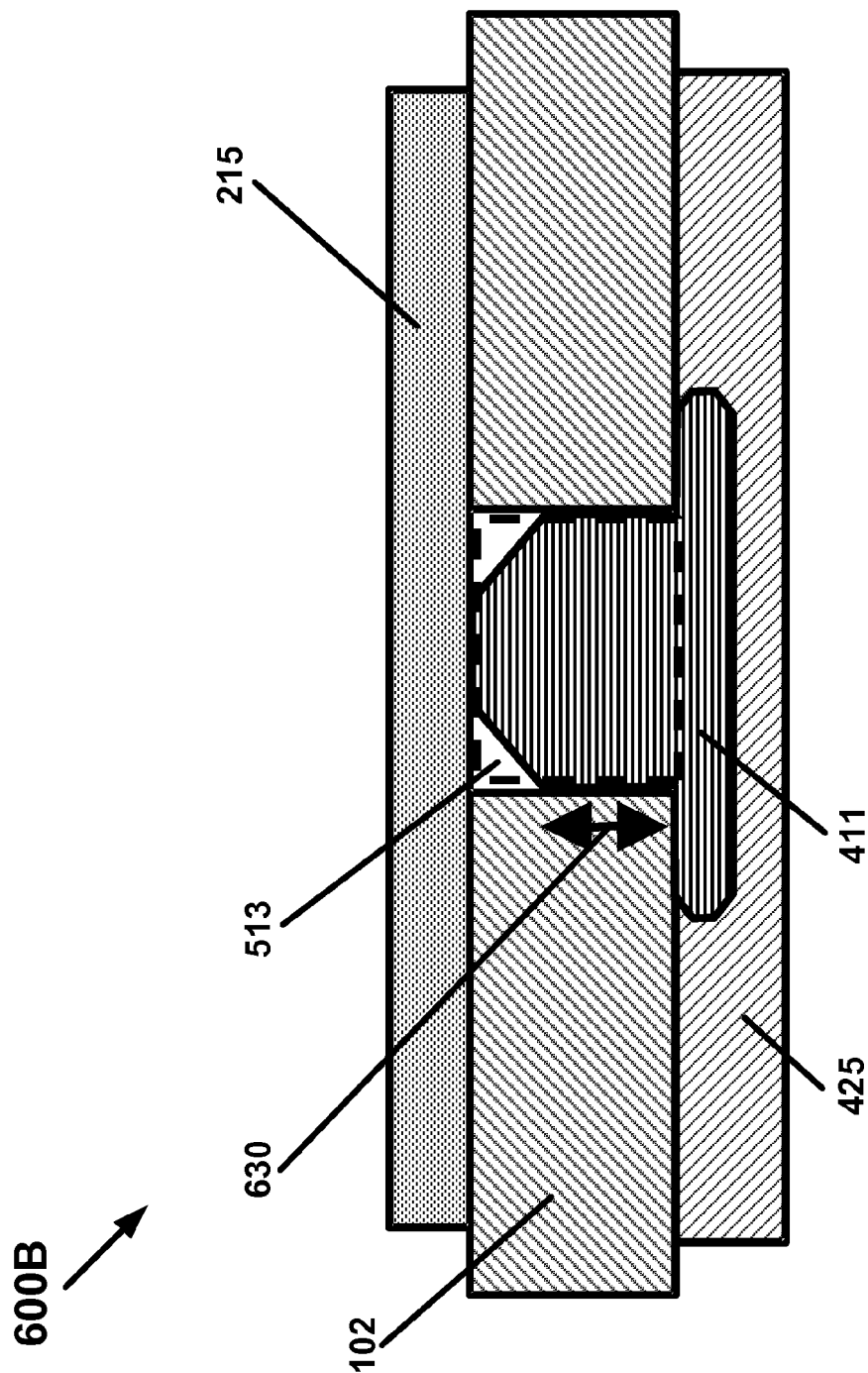
Figure 6C:
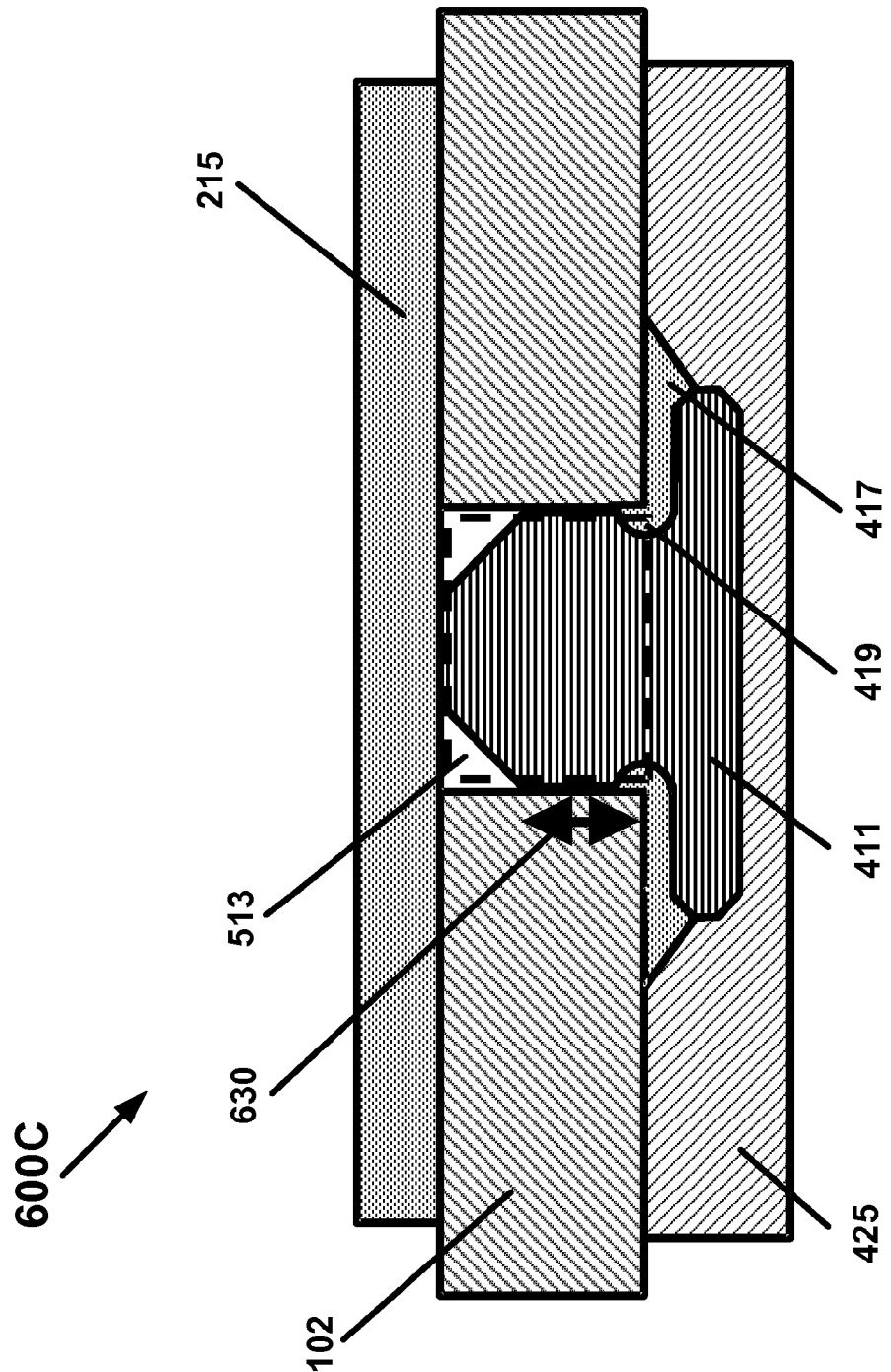
Figure 6D:
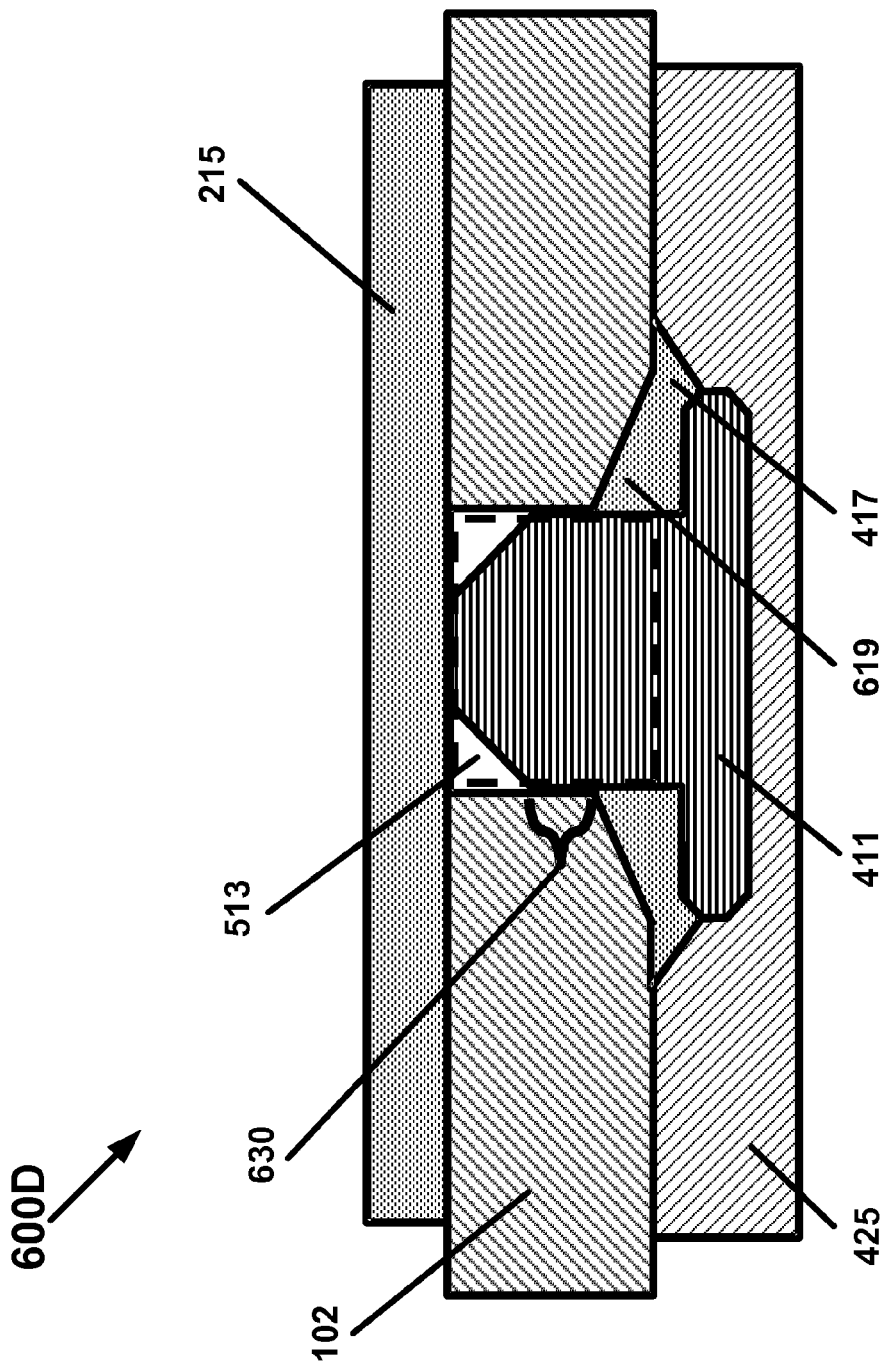

With reference now to FIGS. 6A-6D, in accordance with alternative embodiments of the present invention, cross-sectional views 600A-600D of the encircled portion 6 in FIG. 5 are shown. FIGS. 6A-6D show various example configurations of the through-hole 513 (outlined by dashed lines) in the base 102 of the DE of the hermetically resealable HDD 10. As shown in FIGS. 6A, 6C and 6D, in accordance with embodiments of the present invention, the plug 411 is coated with a sealing compound 417; and, the sealing compound 417 is configured to prevent leakage of the low-density gas out of the DE. By way of example without limitation thereto, the sealing compound 417 may be selected from the group consisting of an adhesive, and an oil. As shown in FIG. 6B, in accordance with another embodiment of the present invention, the hermetically resealable HDD 10 may further include a sealing tape 425 disposed over the plug 411 and a portion of an exterior surface of the DE adjacent to a periphery of the plug 411 such that the sealing tape 425 hermetically seals the plug 411 to the through-hole 513. By way of example without limitation thereto, the sealing tape 425 may include aluminum tape. As shown in both FIGS. 6C and 6D, in accordance with other embodiments of the present invention, the hermetically resealable HDD 10 may further include a sealing-compound reservoir containing sealing compound 417, in communication with the sealing compound 417 coating the plug 411, and configured to replenish the sealing compound 417 coating the plug 411. The sealing-compound reservoir may include two different configurations, by way of example without limitation thereto: as shown in FIG. 6C, a sealing-compound reservoir 419 includes a recess in the plug 411 configured to accommodate reserve amounts of the sealing compound 417; and, as shown in FIG. 6D, a sealing-compound reservoir 619 includes a recess in the base 102, for example, additional space in the through-hole 513 produced by an edge chamfer at the outside orifice of the through-hole 513, configured to accommodate reserve amounts of the sealing compound 417. Also as shown in FIGS. 6C and 6D, in accordance with yet another embodiment of the present invention, the plug 411 is coated with the sealing compound 417; and, the hermetically resealable HDD 10 may further include the sealing tape 425 disposed over the plug 411 and a portion of an exterior surface of the DE adjacent to a periphery of the plug 411 such that the sealing tape 425 hermetically seals the plug 411 to the through-hole 513. Moreover, as shown in FIGS. 6A-6D, the hermetically resealable HDD 10 further includes a filter 215 disposed over an interior orifice of the through-hole 513; and, the filter 215 is configured to filter the low-density gas admitted to an interior space of the DE. As shown in FIGS. 6A-6D, the longer the length 630 of the contact region between the shank of the plug 411 and the side-walls off the base 102 defined by the through-hole 513, the better the resistance of the seal provided by the press-fit plug 411 to out-diffusion and escape of the low-density gas from the interior space of the hermetically resealable HDD 10. Therefore, in accordance with an embodiment of the present invention, the length 630 of the contact region between the shank of the plug 411 and the side-walls off the base 102 defined by the through-hole 513 may be increased by burring the through-hole 513, increasing the thickness of the base 102, or increasing the length of shank portion of the plug in the through-hole 513 to about equal the length of the through-hole 513.

Figure 7:
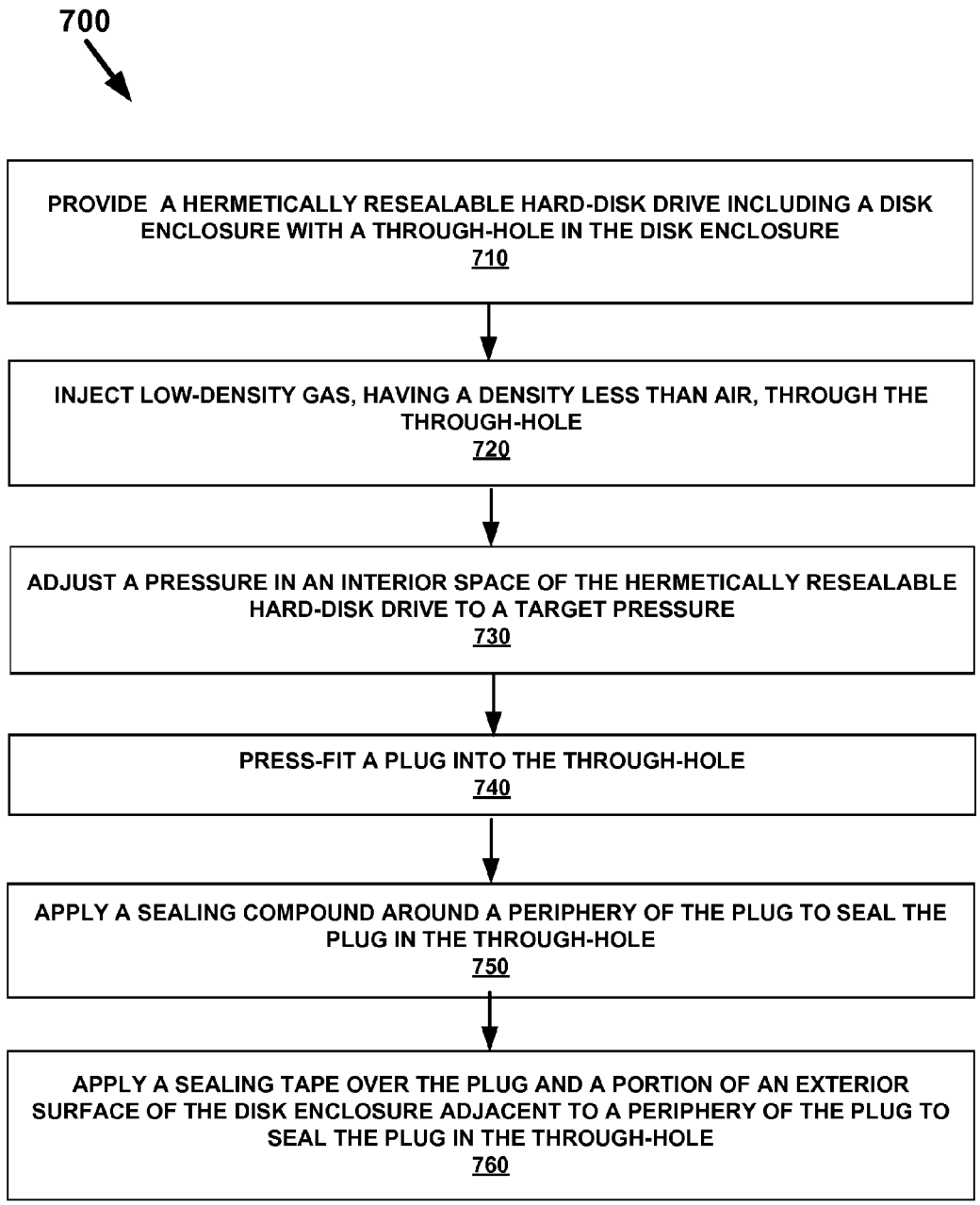
FIG. 7 is a flowchart of a method for injecting low-density gas into, and sealing, the hermetically resealable HDD, in accordance with an embodiment of the present invention.

With reference now to FIG. 7, in accordance with embodiments of the present invention, a flowchart of a method for injecting low-density gas into, and sealing, the hermetically resealable HDD is shown. The method includes the operations next described. At 710, a hermetically resealable HDD including a DE with a through-hole is provided. The through-hole penetrates the DE from an exterior surface of the hermetically resealable HDD to an interior space of the hermetically resealable HDD. The through-hole in the DE may be a pin-hole in the sealed DE; the plug may be a pin; and, sealing the through-hole with the plug may include press-fitting the pin in the pin-hole. By way of example without limitation thereto, the DE may include: a base, a first cover secured to the base, and a second cover joined to the base and covering the first cover; and, a through-hole may be provided in the second cover. The low-density gas may be injected into the base through the through-hole in the second cover, a previously formed through-hole in the first cover, and a filter disposed on the inside of the first cover at a location overlapping the through-hole in the first cover. At 720, a low-density gas, having a density less than air, is injected through the through-hole. The low-density gas may be injected through the through-hole into the DE and through a filter placed inside the DE. At 730, a pressure in the interior space of the hermetically resealable HDD is adjusted to a target pressure. The target pressure may be about 67 kPa Adjusting the pressure may include removing a portion of an amount of the low-density gas from the interior space of the hermetically resealable HDD through the through-hole, by way of example, by vacuum pumping the DE through the through-hole using the gas reinjection tool previously described, without limitation thereto. The low-density gas is selected from the group consisting of hydrogen, nitrogen, and helium. The through-hole may be made in a second cover of the DE, or alternatively, in the base of the DE. At 740, a plug is press fit into the through-hole. At 750, a sealing compound is applied around a periphery of the plug to seal the plug. By way of example without limitation thereto, the sealing compound may be selected from the group consisting of an adhesive, and an oil. At 760, a sealing tape is applied over the plug and a portion of an exterior surface of the DE adjacent to a periphery of the plug to seal the plug in the through-hole. By way of example without limitation thereto, the sealing tape may include an aluminum tape.

Figure 8:
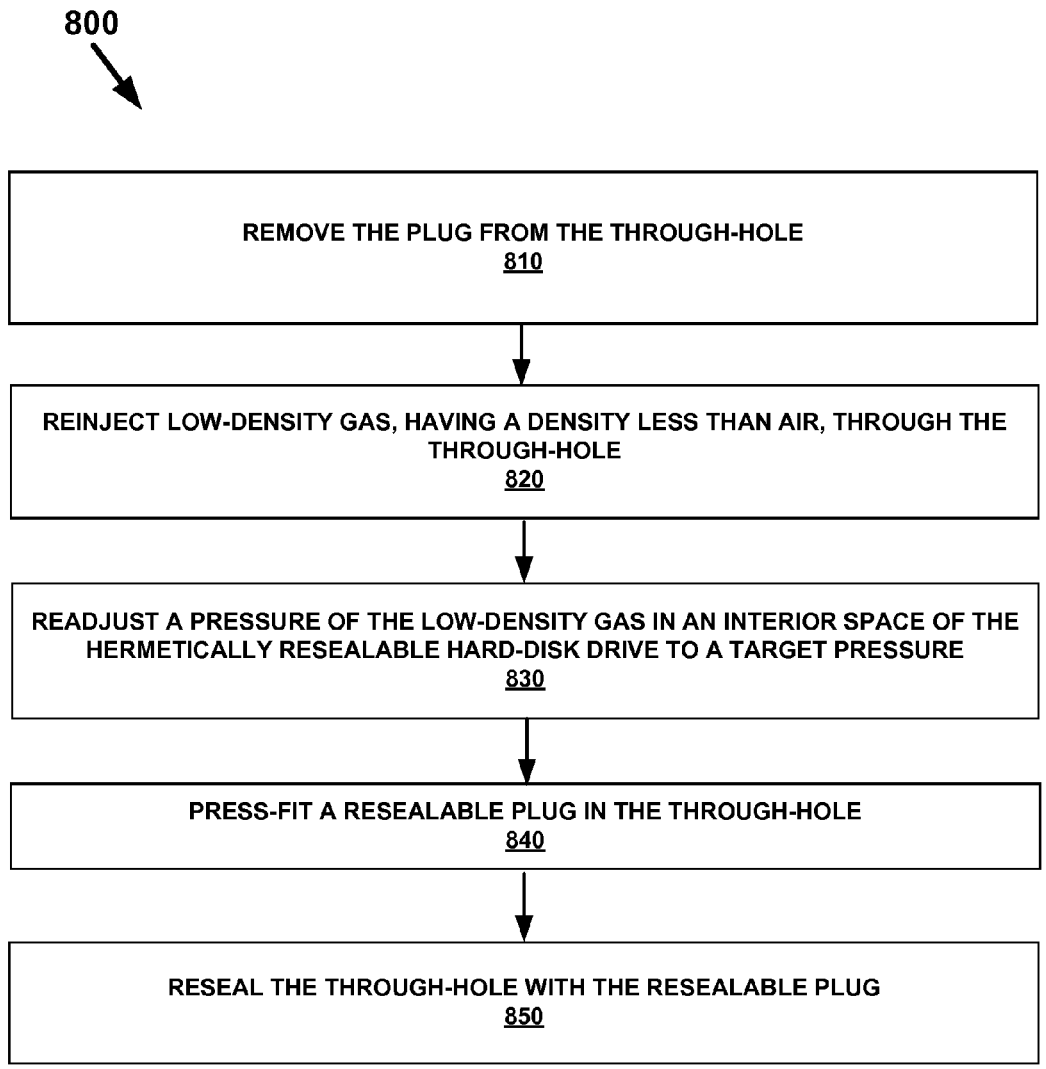
FIG. 8 is a flowchart of the method of FIG. 7 including further operations associated with recharging the DE of the hermetically resealable HDD with the low-density gas, in accordance with another embodiment of the present invention.

With reference now to FIG. 8, in accordance with embodiments of the present invention, a flowchart of further operations associated with recharging the DE of the hermetically resealable HDD with the low-density gas of the method described above in the discussion of FIG. 7 is shown. The method includes the operations next described. At 810, the plug is removed from the through-hole. At 820, low-density gas, having a density less than air, is reinjected through the through-hole. At 830, a pressure of the low-density gas in the interior space of the hermetically resealable HDD is readjusted to a target pressure. At 840, a resealing plug, similar to the plug which is removed, is press fit into the through-hole. At 850, the through-hole is resealed with the resealing plug. The resealing plug may have a second diameter larger than a diameter of the plug that is removed from the through-hole. The above described recharging procedure may be performed repeatedly to adjust the target pressure inside the DE.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A hermetically resealable hard-disk drive configured for recharging with a low-density gas, said hermetically resealable hard-disk drive comprising:
    a disk enclosure including a base, and a first cover and a second cover joined to said base by an adhesive layer, said second cover disposed above said first cover;
    said adhesive layer disposed between said first cover and said second cover and having a periphery smaller than peripheries of said first and second covers and comprising at least one slit, said adhesive layer reinforcing said second cover by bonding said second cover to said first cover;
    a magnetic-recording disk configured to rotate inside said disk enclosure;
    a head-slider comprising a magnetic-recording head configured to write data to, and to read data from, said magnetic-recording disk;
    an actuator configured to move said head-slider above said magnetic-recording disk, and to access said data;
    a low-density gas, having a density less than air, substantially filling said disk enclosure;
    a through-hole in said second cover, said through-hole configurable for injection of said low-density gas into said disk enclosure; and
    a plug press-fitted into and hermetically sealing said through-hole, said plug comprising a flat top portion configured to be flush with an outer surface of said second cover when fitted in said through-hole;
    wherein said plug is removable to allow recharging said disk enclosure with said low-density gas, and said through-hole is configured to accept a resealing plug to be press-fit into and to reseal hermetically said through-hole after said recharging.

2. The hermetically resealable hard-disk drive of claim 1, further comprising:
    a second through-hole in said first cover, said second through-hole configured for injection of said low-density gas into an interior space of said disk enclosure.

3. The hermetically resealable hard-disk drive of claim 2, further comprising:
    a filter disposed over an orifice of said second through-hole, said filter configured to filter said low-density gas admitted to said interior space of said disk enclosure.

4. The hermetically resealable hard-disk drive of claim 1, wherein said plug is coated with a sealing compound, said sealing compound configured to prevent leakage of said low-density gas out of said disk enclosure.

5. The hermetically resealable hard-disk drive of claim 4, further comprising:
    a sealing-compound reservoir containing sealing compound, in communication with said sealing compound coating said plug, and configured to replenish said sealing compound coating said plug.

6. The hermetically resealable hard-disk drive of claim 4, wherein said sealing compound is selected from the group consisting of an adhesive, and an oil.

7. The hermetically resealable hard-disk drive of claim 1, wherein said plug comprises a tapered shank with a taper angle less than 3 degrees.

8. The hermetically resealable hard-disk drive of claim 1, further comprising:
    a sealing tape disposed over said plug and a portion of an exterior surface of said disk enclosure adjacent to a periphery of said plug, said sealing tape hermetically sealing said plug to said through-hole.

9. The hermetically resealable hard-disk drive of claim 8, wherein said sealing tape comprises an aluminum tape.

10. The hermetically resealable hard-disk drive of claim 1, wherein said low-density gas is selected from the group consisting of hydrogen, nitrogen, and helium.

11. The hermetically resealable hard-disk drive of claim 1, wherein a pressure of said low-density gas inside said disk enclosure is substantially less than atmospheric pressure.

12. A method for injecting low-density gas into a hermetically resealable hard-disk drive and sealing said hermetically resealable hard-disk drive after injecting said low-density gas, said method comprising:
    providing a hermetically resealable hard-disk drive including a disk enclosure with a through-hole in said disk enclosure, said resealable hard drive including a base, a first cover and a second cover joined to said base by an adhesive;
    providing said adhesive layer and disposing said adhesive layer between said first cover and said second cover, said adhesive layer having a periphery smaller than peripheries of said first and second covers and comprising at least one slit, said adhesive layer reinforcing said second cover by bonding said second cover to said first cover;
    providing a plug comprising a flat top portion configured to be flush with an outer surface of said disk enclosure when fitted in said through-hole;
    injecting low-density gas, having a density less than air, through said through-hole;
    positioning said plug in said through-hole and pressing said top flat portion of said plug thereby press-fitting said plug into said through-hole;
    sealing said through-hole hermetically with said plug.

13. The method of claim 12, further comprising:
    adjusting a pressure in an interior space of said hermetically resealable hard-disk drive to a target pressure.

14. The method of claim 13, wherein said target pressure is about 67 kilopascal (kPa).

15. The method of claim 12, further comprising:
    applying a sealing compound around a periphery of said plug to seal said plug in said through-hole.

16. The method of claim 12, further comprising:
applying a sealing tape over said plug and a portion of an exterior surface of said disk enclosure adjacent to a periphery of said plug to seal said plug in said through-hole.

17. The method of claim 12, further comprising:
removing said plug from said through-hole;
reinjecting low-density gas, having a density less than air, through said through-hole;
readjusting a pressure of said low-density gas in an interior space of said hermetically resealable hard-disk drive to a target pressure;
press-fitting a resealing plug in said through-hole; and
resealing said through-hole with said resealing plug; and
wherein said resealing plug has a second diameter larger than a diameter of said plug removed from said through-hole.

* * * * *